US006964035B2

(12) United States Patent
Poynor

(10) Patent No.: US 6,964,035 B2
(45) Date of Patent: Nov. 8, 2005

(54) DEBUGGING AN OPERATING SYSTEM KERNEL WITH DEBUGGER SUPPORT IN A NETWORK INTERFACE CARD

(75) Inventor: Todd Poynor, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 621 days.

(21) Appl. No.: 09/898,204

(22) Filed: Jul. 3, 2001

(65) Prior Publication Data

US 2003/0009548 A1 Jan. 9, 2003

(51) Int. Cl.[7] ........ G06F 9/44
(52) U.S. Cl. ........ 717/124
(58) Field of Search ........ 717/124, 135, 717/172; 714/4, 25, 29–47; 713/201; 709/208, 709/224–226; 712/227

(56) References Cited

U.S. PATENT DOCUMENTS 5,611,044 A * 3/1997 Lundeby ........ 714/38
5,630,049 A * 5/1997 Cardoza et al. ........ 714/25
5,721,876 A * 2/1998 Yu et al. ........ 703/27
5,935,262 A * 8/1999 Barrett et al. ........ 714/46
6,011,920 A * 1/2000 Edwards et al. ........ 717/130
6,334,153 B2 * 12/2001 Boucher et al. ........ 709/230
6,675,218 B1 * 1/2004 Mahler et al. ........ 709/230

* cited by examiner

*Primary Examiner*—Kakali Chaki
*Assistant Examiner*—Tuan A. Vu

(57) ABSTRACT

Method and apparatus for debugging an operating system kernel. A server data processing system includes a debugger control component and a network interface card that implements a protocol stack, including layers from a physical layer through an application layer. The network interface card further includes a debugger network component. Debugger control messages received by the network interface card are directed to the debugger network component. The debugger network component communicates the debugger messages to the debugger control component in the kernel, and the debugger control component performs debugging operations in response to the debugger messages.

17 Claims, 5 Drawing Sheets

DEBUGGING AN OPERATING SYSTEM KERNEL WITH DEBUGGER SUPPORT IN A NETWORK INTERFACE CARD

FIELD OF THE INVENTION

The present invention generally relates to debugging computer software, and more particularly to debugging an operating system kernel.

BACKGROUND

The kernel of an operating system manages the hardware resources in a computer system. For example, the kernel manages the memory, processor, input/output resources, and retentive storage resources of the computer system. Debugging the code that implements the functionality of the kernel is more difficult than debugging application software since debugger tools generally rely on the services provided by the operating system. If the kernel code relied upon by the debugger tool does not function as intended, then the debugging tool may not operate as intended or report erroneous results. Thus, it may be difficult to replicate and isolate certain errors in the kernel.

Given the resources managed by the kernel and the processing needs of debugger tools, various strategies have been adopted to test operating system kernels. One debugging strategy uses a client-server arrangement to implement the debugging tool. Selected user interface capabilities of the debugging tool are implemented on a client system, and debugger control functions are implemented on the server system. The client and server components of the debugger communicate via a network.

Some LAN-based debuggers implement networking code that is separate from the networking code of the kernel. However, the size and complexity of TCP protocols makes it infeasible to maintain a dedicated program to convert between TCP and lower-level protocols used by the debugger. Thus, some debuggers are based on the Ethernet layer or the UDP protocol and lack the benefits provided by TCP, such as reliable communications from anywhere in the Internet. Other debuggers include daemons that execute on systems on the network, which are near the server system and convert between the lower-level network traffic and the TCP protocol. In yet another approach, if network access is required for traffic other than debugging, at least two networking interface cards are provided, one dedicated to debugging traffic and another dedicated to other network traffic.

Developers are sometimes confronted with the task of debugging a kernel on server hardware that lacks a second LAN interface card to support debugging. Other times, the server is connected to a network for which the requisite protocol conversion daemon has not been installed. Faced with these obstacles, developers may forego the benefits of robust debuggers and resort to print statements in the kernel code, which lacks the flexibility and capabilities of debugger tools.

A system and method that address the aforementioned problems, as well as other related problems, are therefore desirable.

SUMMARY OF THE INVENTION

A method and apparatus for debugging an operating system kernel are provided in various embodiments of the invention. A server data processing system includes a debugger control component and a network interface card that implements a protocol stack, including layers from a physical layer through an application layer. The network interface card further includes a debugger network component. Debugger control messages received by the network interface card are directed to the debugger network component. The debugger network component communicates the debugger messages to the debugger control component in the kernel, and the debugger control component performs debugging operations in response to the debugger messages.

Various example embodiments are set forth in the Detailed Description and Claims which follow.

BRIEF DESCRIPTION OF THE DRAWINGS

Various aspects and advantages of the invention will become apparent upon review of the following detailed description and upon reference to the drawings in which.

DETAILED DESCRIPTION

In various embodiments of the invention, a network interface card (NIC) includes circuitry that implements a selected network protocol stack and a debugger component to handle network traffic generated in controlling debugging operations ("debugger traffic"). All network traffic passes through the protocol stack circuitry, with the debugger traffic being passed to the debugger component. The debugger component interfaces with a kernel-based debugger control component. Implementation of the debugger component on the NIC allows a single card to be used for both normal network traffic and debugger traffic. In addition, the debugger arrangement can utilize the protocol stack without interference with kernel operations.

Figure 1:
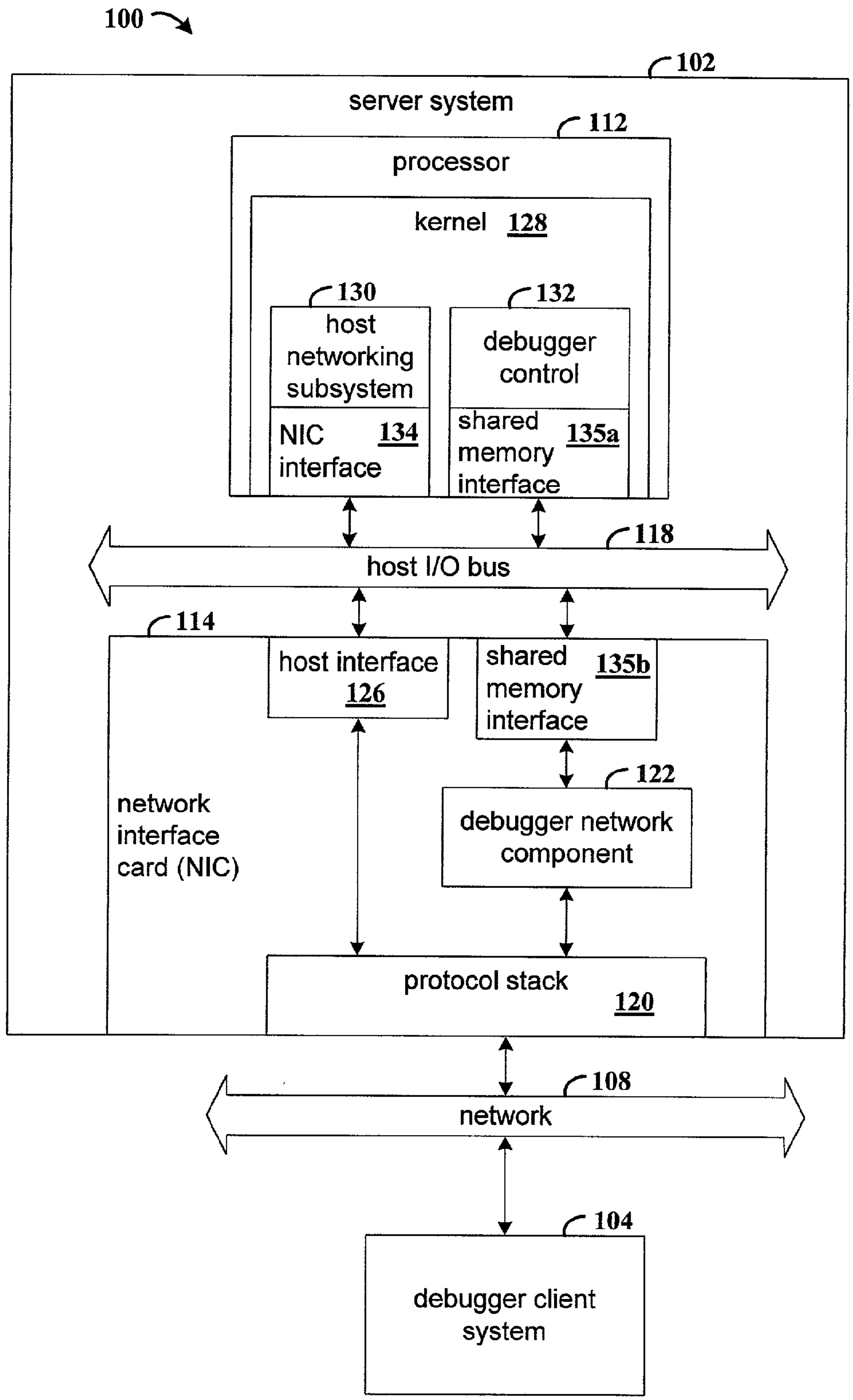
FIG. 1 is a functional block diagram of a computing arrangement for debugging an operating system kernel in accordance with one embodiment of the invention.

FIG. 1 is a functional block diagram of a computing arrangement for debugging an operating system kernel in accordance with one embodiment of the invention. System 100 includes a server data processing system 102 that is coupled to a debugger client system 104 via network 108. Client system 104 is a system that hosts client-side debugger software. For example, the debugger client system provides a user interface for user control of the debugger arrangement, translates higher-level user commands into the lower-level debugging operations performed by the server system, and performs I/O to read disk-resident information such as mappings from symbolic names to compiled addresses.

Server system 102 includes a conventional processor 112 that is coupled to network interface card (NIC) 114 via the host I/O bus 118 (e.g., PCI bus). The network protocol stack 120 is implemented on the NIC 114, along with debugger network component 122, and host interface 126. NIC 114 provides a network interface for server system 102, along with a separate channel through which debugger traffic is routed between the NIC 114 and the kernel 128. The protocol stack 120 implements the physical layer through the application layer in one embodiment.

Along with providing the network protocol services, the protocol stack 120 detects incoming debugger traffic from debugger client system 104. In one embodiment, the protocol stack recognizes incoming debugger traffic by a reserved port number, which is used exclusively by the debugger client system 104. It will be appreciated that other protocols have different mechanisms for communication, such as sessions. The incoming debugger traffic is directed to debugger network component 122, which interfaces with the debugger control 132 in the kernel using debugger shared memory interfaces 135*a* and 135*b*. The debugger network component 122 interfaces with the protocol stack 120 to send outgoing debugger traffic to the debugger client system 104.

Processor 112 hosts operating system kernel 128, which includes a host networking subsystem 130 and a debugger control component 132. NIC interface 134 provides the software interface to NIC 114 for the host networking subsystem 130, and debugger shared memory interface 135*a* provides the software interface to debugger shared memory interface 135*b* on NIC 114 for debugger control 132.

The host networking subsystem 130 implements the operating system support for the networking protocols on the NIC, such as to transfer to or from the NIC the (non-debugger) data packets being sent or received by the host, and to configure the networking protocols as needed by the host (for example, setting the proper Internet Protocol network address).

The debugger control 132 is a part of the kernel that provides debugger functions such as single stepping, setting breakpoints, changing values in memory, and reading values from memory. In addition, the debugger control is adapted to interface with the debugger network control component 122 via the debugger shared memory interfaces 135*a* and 135*b* without other support from the kernel. In one embodiment, the debugger network component 122 and debugger control 132 communicate using shared memory areas of server system 102. This avoids hooks by the debugger control into the host networking subsystem which may limit debugging capabilities as explained above.

Further details regarding an example implementation of NIC 114 can be found in the application/patent entitled, "PROCESSING NETWORK PACKETS", by Russell et al., filed on Aug. 11, 2000, having application No. 09/630,033, and assigned to the assignee of the present invention, now issued as U.S. Pat. No.: 6,678,746.

Figure 2:
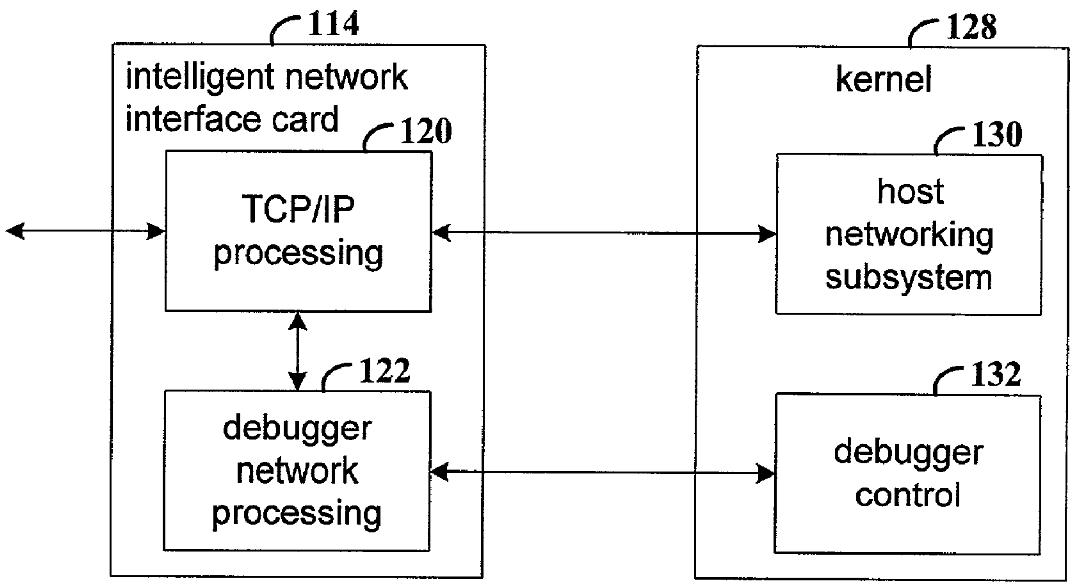
FIG. 2 is a functional block diagram that illustrates the interaction between components of a debugging arrangement and the operating system kernel.

FIG. 2 is a functional block diagram that illustrates the interaction between components of a debugging arrangement and the operating system kernel 128. FIG. 2 illustrates the interaction of selected components of FIG. 1. All network traffic flows through protocol stack 120 of the NIC 114. The protocol stack separates incoming debugger traffic from all other incoming network traffic. The incoming network traffic is directed to the debugger network component 122, and the other incoming traffic is routed to the host networking subsystem 130.

Figure 3:
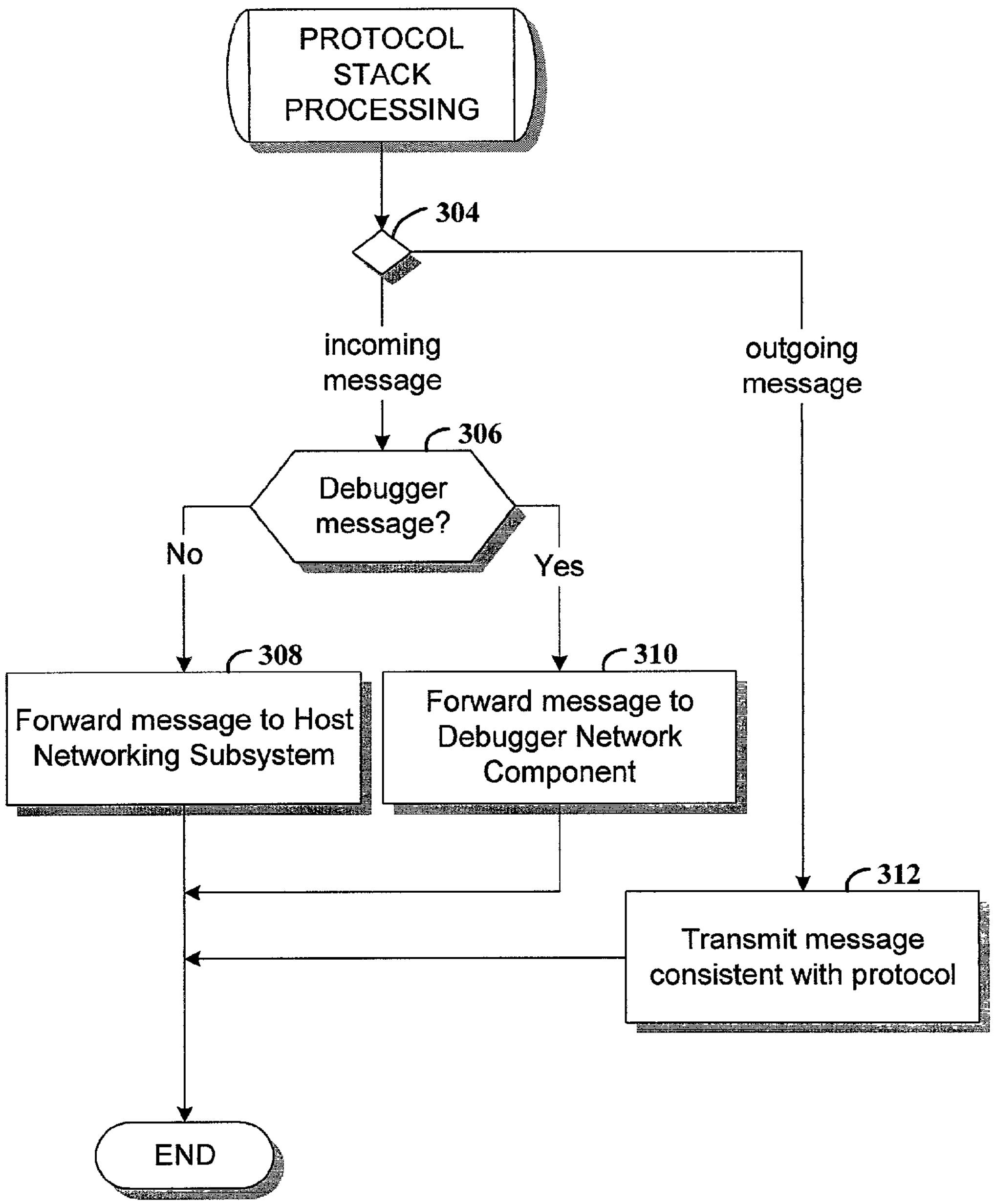
FIG. 3 is a flowchart of an example process implemented by a protocol stack in accordance with one embodiment of the invention.

The debugger network component 122 provides the incoming debugger traffic to the debugger control 132. It will be appreciated that the interface between the debugger network component and the debugger control avoids reliance on and limitations imposed by the host networking subsystem 130. This supports debugging without being limited by dependencies on the kernel and without requiring a complex and dedicated network interface FIG. 3 is a flowchart of an example process implemented by the protocol stack 120 in accordance with one embodiment of the invention. If an incoming message is in process, decision step 304 directs the process to decision step 306, which determines whether the message is a debugger message. In one embodiment, the protocol stack dedicates a port for use by the debugger client system 104 and debugger network component 122.

For non-debugger messages, the process is directed to step 308, where the incoming message is forwarded to the host networking subsystem 130. Debugger messages are forwarded to the debugger network component 122 on the NIC 114, as shown by step 310. The debugger network component 122 interfaces with the debugger control 132 without relying on kernel 128 services. In one embodiment, the debugger network component 122 interfaces with the debugger control 132 via shared memory, for example.

For outgoing messages, decision step 304 directs the process to step 312, where the message is transmitted consistent with the protocol. It will be appreciated that the protocol stack 120 performs additional protocol-specific processing beyond that illustrated in FIG. 3, and that a variety of network protocols are adaptable to work with the process of FIG. 3.

Figure 4A:
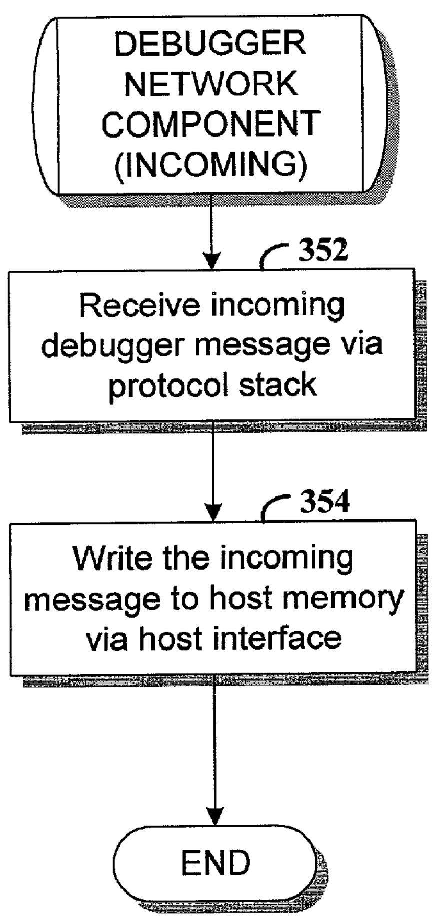
FIG. 4A is a flowchart of an example process performed by a debugger network component for incoming debugger messages.

FIG. 4A is a flowchart of an example process performed by the debugger network component 122 for incoming debugger messages. At step 352, the debugger network component receives an incoming debugger message on a port dedicated to debugger traffic. At step 354, the incoming message is written to memory of the server system 102 via host interface 126. The memory area to which the message is written is shared between the debugger network component 122 and the debugger control 132. In an example embodiment, shared memory interface 135*b* creates a linked list of incoming messages in the shared memory area. The list also includes a "list head" pointer and a "lock" word used to coordinate access to the shared memory area between interfaces 135*a* and 135*b*. To signal an incoming message, interface 135*b* raises an interrupt for debugger control 132 with processor 122. In another embodiment, debugger network component 122 and debugger control 132 periodically poll for messages.

Figure 4B:
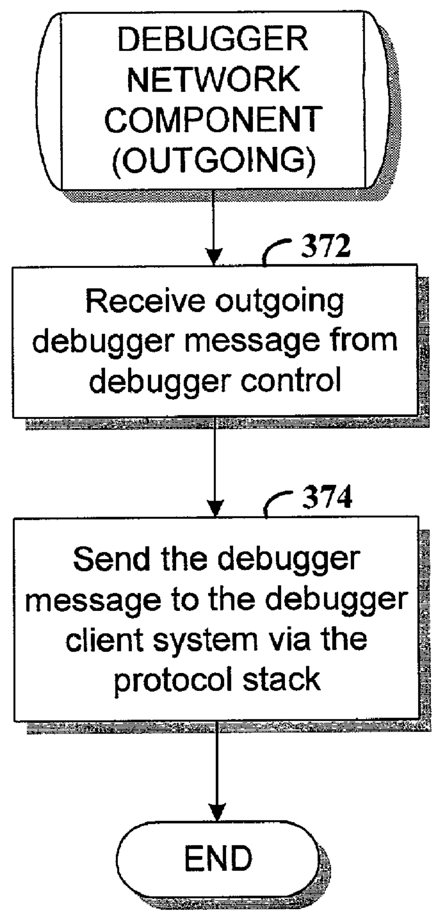
FIG. 4B is a flowchart of an example process performed by the debugger network component at the target system for outgoing debugger messages.

FIG. 4B is a flowchart of an example process performed by the debugger network component at the target system for outgoing debugger messages. At step 372, the debugger network component 122 receives an outgoing message from the debugger control 132. In one embodiment, shared memory interface 135*a* raises an interrupt with NIC 114 to signal a message for debugger network component 122. Alternatively, debugger network component 122 periodically polls the shared memory for a new message. At step 374, the message is sent to the debugger client system via the dedicated debugger port provided by the protocol stack 120.

Figure 5:
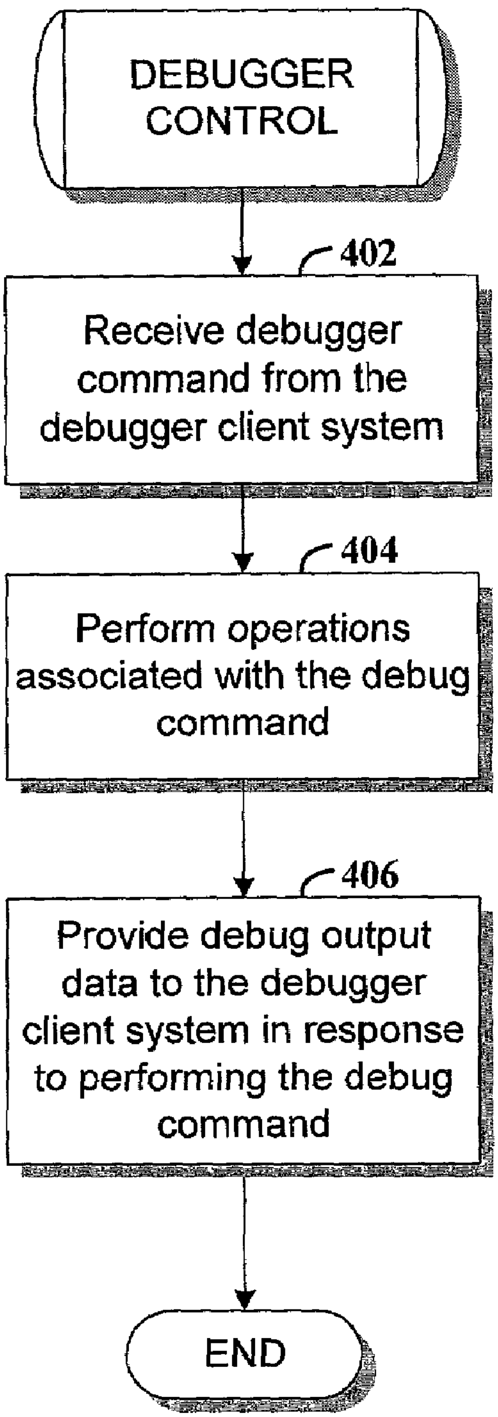
FIG. 5 is a flowchart of an example process implemented within an operating system kernel for controlling debugger functions.

FIG. 5 is a flowchart of an example process implemented within an operating system kernel for controlling debugger functions. Debugger control 132 within the kernel responds to commands issued from the debugger client system 104 to control debugging activities. At step 402, debugger control 402 receives a debugger command from the debugger client system 104. The command is read from the memory area shared by the debugger network component 122 on the NIC 114 and the debugger control 132.

At step 404, the command is decoded and operations associated with the command are performed. Example debugger commands include single stepping the kernel, setting breakpoints, changing values in memory, and reading values from memory.

At step 406, data requested by the debugger client system 104 are output by the debugger control 132. The requested data are written to the server memory that is shared with the debugger network component 122.

It will be appreciated that the process of FIG. 5 is repeated for other commands from the debugger client system.

The present invention is believed to be applicable to a variety of arrangements for debugging operating system kernels and has been found to be particularly applicable and beneficial in a client-server debugging arrangement using TCP/IP protocols. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A computer-implemented method for debugging an operating system kernel executing on a server data processing system that is coupled to a network, the kernel including a debugger control component, and the server data processing system including a network interface card that implements therein a debugger network component and a protocol stack, including layers from a physical layer through an application layer, comprising:

detecting debugger messages and non-debugger messages received over the network in the protocol stack;

directing the debugger messages to the debugger network component on the network interface card;

communicating the debugger messages from the debugger network component to the debugger control component in the kernel via a shared memory interface;

communicating the non-debugger messages from the protocol stack to the kernel and bypassing the shared memory interface; and performing debugging operations via the debugger control component in response to the debugger messages.

2. The method of claim 1, wherein a debugger client system is coupled to the server system and further comprising:

communicating client messages from the debugger control component to the debugger network component;

directing the client messages from the debugger network component to the protocol stack; and transmitting the client messages from the protocol stack to the client system.

3. The method of claim 1, further comprising detecting the debugger messages by a port number assigned to the debugger network component.

4. The method of claim 3, wherein the protocol stack implements a TCP/IP stack.

5. The method of claim 1, further comprising writing the debugger messages from the debugger network component to memory of the server data processing system.

6. The method of claim 1, further comprising writing the client messages from the debugger control component to memory of the server data processing system.

7. An apparatus for debugging an operating system kernel executing on a server data processing system that is coupled to a network, the kernel including a debugger control component, and the server data processing system including a network interface card that implements therein a protocol stack, including layers from a physical layer through an application layer, and a debugger network component, comprising:

means for detecting debugger messages and non-debugger messages received over the network in the protocol stack;

means for directing the debugger messages to the debugger network component via a shared memory interface;

means for communicating the debugger messages from the debugger network component to the debugger control component in the kernel;

means for communicating the non-debugger messages from the protocol stack to the kernel and bypassing the shared memory interface; and means for performing debugging operations via the debugger control component in response to the debugger messages.

8. A computing arrangement for debugging an operating system kernel in a server system that is coupled to a client system via a network, comprising:

a memory configured in the server system;

a processor coupled to the memory and configured to execute an operating system kernel, the kernel including a debugger control component and a networking subsystem component, the debugger control component configured to perform debugging operations in response to debugger messages received over the network, and the networking subsystem configured to provide non-debugger messages to the kernel; and a network interface circuit arrangement coupled to the processor and to the memory, the network interface circuit arrangement configured with a protocol stack therein and a debugger network component, the protocol stack configured to detect debugger messages and non-debugger messages received over the network and direct the debugger messages to the debugger network component, the debugger network component configured to communicate the debugger messages to the debugger control component in the kernel via a shared memory interface, and the protocol stack configured to communicate the non-debugger messages from the protocol stack to the kernel and bypass the shared memory interface.

9. The arrangement of claim 8, wherein:

the debugger control component is further configured to communicate client messages from the debugger control component to the debugger network component;

the debugger network component is further configured to direct the client messages to the protocol stack; and the protocol stack is further configured to transmit the client messages to the client system.

10. The arrangement of claim 8, wherein the protocol stack is further configured to detect the debugger messages by a port number assigned to the debugger network component.

11. The arrangement of claim 10, wherein the protocol stack is a TCP/IP stack.

12. The arrangement of claim 11, wherein:

the debugger control component is further configured to communicate client messages from the debugger control component to the debugger network component;

the debugger network component is further configured to direct the client messages to the protocol stack; and the protocol stack is further configured to transmit the client messages to the client system.

13. A method for debugging an operating system kernel, comprising:

executing the operating system on a server data processing system that is coupled to a network, wherein the kernel includes a debugger control component and a network interface subsystem;

identifying in a protocol stack in a network interface card, debugger messages and non-debugger messages received over the network, wherein the network interface card implements a protocol stack that includes layers from a physical layer through an application layer and a debugger network component coupled to the protocol stack;

transmitting debugger messages from the protocol stack to the debugger network component on the network interface card; transmitting the debugger messages from the debugger network component to the debugger control component in the kernel via a shared memory interface;

transmitting non-debugger messages from the protocol stack to the network interface subsystem of the kernel and bypassing the shared memory interface; and performing debugging operations via the debugger control component in response to the debugger messages.

14. The method of claim 13, wherein a debugger client system is coupled to the server system and further comprising:

transmitting client messages from the debugger control component to the debugger network component;

transmitting the client messages from the debugger network component to the protocol stack; and transmitting the client messages from the protocol stack to the client system.

15. The method of claim 13, further comprising detecting the debugger messages by a port number assigned to the debugger network component.

16. The method of claim 15, wherein the protocol stack implements a TCP/IP stack.

17. An apparatus for debugging an operating system kernel, comprising;

means for executing the operating system on a server data processing system that is coupled to a network, wherein the kernel includes a debugger control component and a network interface subsystem;

means for identifying in a protocol stack in a network interface card, debugger messages and non-debugger messages received over the network, wherein the network interface card implements a protocol stack that includes layers from a physical layer through an application layer and a debugger network component coupled to the protocol stack;

means for transmitting debugger messages from the protocol stack to the debugger network component on the network interface card;

means of transmitting the debugger messages from the debugger network component to the debugger control component in the kernel via a shared memory interface;

means for transmitting non-debugger messages from the protocol stack to the network interface subsystem of the kernel and bypassing the shared memory interface; and means for performing debugging operations via the debugger control component in response to the debugger messages.

* * * * *